July 21, 1936. H. E. O. SCHMIDT ET AL 2,048,627
HACKSAW
Filed Jan. 8, 1935
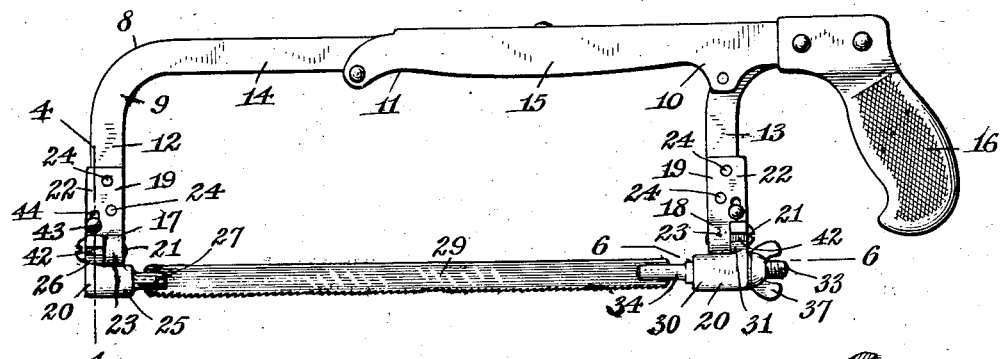
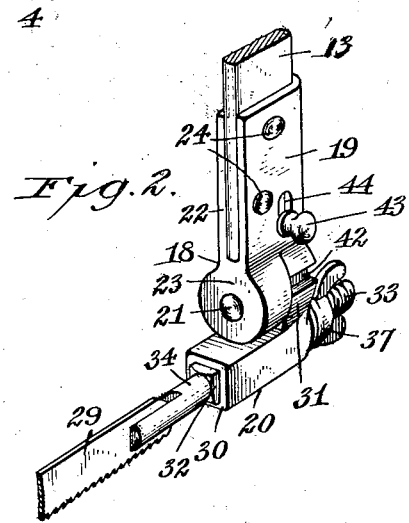
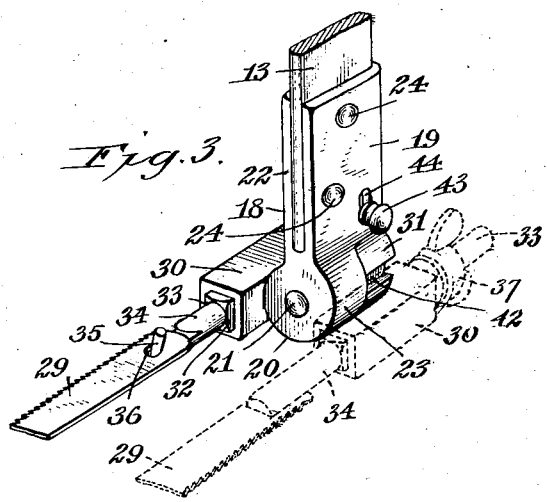
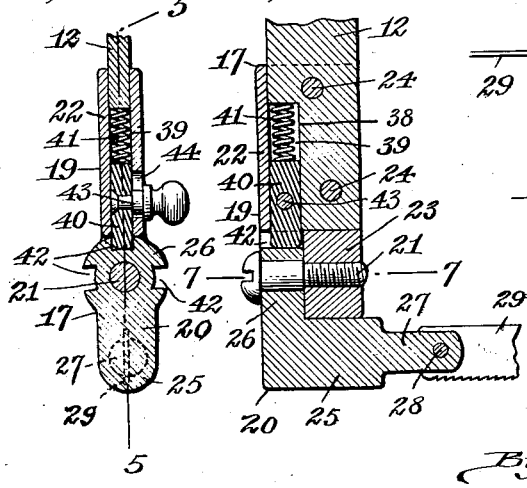
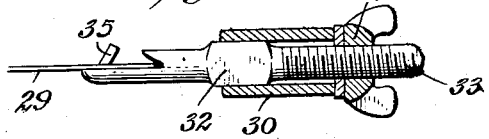
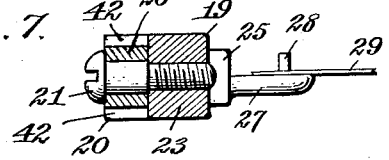
Herbert E. O. Schmidt
Christopher J. Haeberle,
Inventors.
By Emil Keubart, Attorney.

Patented July 21, 1936

2,048,627

UNITED STATES PATENT OFFICE 2,048,627

HACKSAW

Herbert E. O. Schmidt and Christopher J. Haeberle, Buffalo, N. Y.

Application January 8, 1935, Serial No. 849

4 Claims. (Cl. 145—34)

Our invention relates to hack-saws, and has more particular reference to that type of saw in which the saw blade is capable of being adjusted at right angles to its normal position.

In the use of hack-saws, conditions are occasionally encountered where the frame of the saw acts as an obstruction when the saw blade is positioned in the plane of the saw; for example, when sawing an article to a greater depth than the space between the saw blade and the horizontal or upper member of the frame, or when a portion of an object is to be sawed which has parts above it in the plane of the horizontal or upper member of the frame. At such times it is necessary to position the saw blade at an angle to the frame so that the frame will not come in contact with the article or object operated upon.

Various forms of hack-saws have been devised to accomplish this result, but they have been more or less complicated and in all instances difficult to adjust, requiring in most instances the services of two persons to make the adjustment with any degree of convenience.

In hack-saws of this type it is highly desirable to effect the adjustment quickly and conveniently by the workman using the saw without the assistance of others, and one of the objects of our invention is to position the adjustable parts in such close proximity to the saw blade that the adjustment can be effected to swing the saw-blade into angular position, either to the right or left, with the thumbs and index fingers while holding the ends of the frame in both hands.

Another object of our invention is the production of simple and effective adjusting-means embodied within the blade-holding heads of the frame.

Another object is to so construct the blade-holding heads that they not only embody the blade-adjusting means but are capable of replacing the blade-holding heads now employed in the conventional type of hack-saws.

A further object of our invention is to provide a hack-saw in which the blade-holding heads are formed of two relatively movable parts, one pivotally connected to the other and having their pivots offset with respect to the saw blade so that rotation of the saw blade is unnecessary, and so that the saw blade need only be swung through an arc of a circle, either to the right or left as may be found advantageous in executing the intended operation.

A still further object of our invention is to include simple and effective locking mechanism in the adjustable blade-holding heads so that the saw blade may be firmly retained in any adjusted position, and to provide said locking mechanism with actuating means in close proximity to the center of rotation of the movable parts of the blade-holding heads for conveniently releasing said locking mechanism and retaining the same in unlocked condition while swinging the saw-blade from one position to another.

With the above and other objects in view to appear hereinafter, our invention consists in the novel construction, arrangement, and combination of parts to be hereinafter described and more particularly pointed out in the subjoined claims.

In the drawing:

Fig. 1 is a side elevation of a hack-saw embodying our invention.

Fig. 2 is a perspective view of a portion of the saw frame including our improved blade-holding head, showing the saw blade parallel with the frame, or in normal position.

Fig. 3 is a similar view showing the saw blade swung into angular position in one direction in full lines and in an opposite direction in dotted lines.

Fig. 4 is an enlarged transverse section taken on line 4—4, Fig. 1.

Fig. 5 is a section taken on line 5—5, Fig. 4.

Fig. 6 is an enlarged horizontal section taken on line 6—6, Fig. 1.

Fig. 7 is a section taken on line 7—7, Fig. 5.

Referring now to the drawing in detail, like letters of reference refer to like parts in the several figures.

The reference numeral 8 designates the frame of the saw and it is formed in the conventional manner of two sections 9, 10, adjustably connected together to permit of lengthening or shortening the frame to accommodate saw blades of different lengths.

As is common, the frame is constructed in the main of flat bar metal and comprises a longitudinal or header member 11 and end members 12, 13; the outer end member 12 being integral with a portion 14 of the header member and the portion 14 telescoped and adjustable in a channel-shaped portion 15 of the header member; suitable means being provided to retain the two portions 14 and 15 in any adjusted position, depending on the length the frame is to have to properly receive a selected saw blade. Various ways of connecting the two portions of the header member are now known and in common use and as this forms no part of our invention we deem it unnecessary to describe the same in detail.

The upper end of the inner end member 13 is fitted in and attached to the channel-shaped portion 15 of the header member and a handle 16 is provided which is attached to said header member at its inner end.

The parts of the saw thus far set out in detail form no part of our invention and merely describe a frame of conventional type having an arch-like body portion in which the end members 12 and 13 are formed of flat bar material and to the extremities of these, blade-holding heads are usually riveted in hack-saws of this type now in use.

It is the purpose of our invention to provide, not only a complete hack-saw with the angular adjustability of the saw blade embodied therein, but also one in which our invention is embodied in blade-holding heads capable of replacing the ordinary blade-holding heads of the conventional hack-saws. Therefore, when embodying our invention in a complete hack-saw as an article of manufacture, we may desire to use the main portion of the saw frame illustrated in the accompanying drawing, or any other saw frame serving the same purpose.

In any event we prefer to secure blade-holding elements or heads 17, 18, to the end members 12 and 13 by means of rivets and each of these elements or heads comprises a rigid part 19 and a movable, preferably swingable part 20; such parts being so termed by reason of the fact that the parts 19 are fixedly secured to the end members 12 and 13 of the frame, while the movable or swingable parts 20 are connected to said fixed parts by screw pivots 21.

Each of the fixed parts of the blade-holding heads 17 and 18 comprises a side-opening channel-shaped member 22 into which the lower end of an end member 12 or 13 is fitted and a cylindrical member 23 at the lower end of said channel-shaped member of approximately half the width of the latter. Rivets 24 are passed through the channel-shaped members and the portions of the end members inserted thereinto to firmly secure said fixed parts to the main portion of the frame, so termed because the blade-holding heads 17 and 18 form portions of the complete frame.

The movable part of the blade-holding head at the outer end of the saw frame comprises a solid longitudinally-disposed member 25 and a cylindrical member 26 projecting upwardly from its outer end and adapted to have its inner flat face in contact with the outer flat face of the cylindrical member of the associated fixed part 19. These cylindrical parts are of like diameter and pivotally connected together by one of the screw pivots 21.

Projecting inwardly from the longitudinally-disposed member 25 is a half-round stud 27 from the flat side of which a retainer pin 28 projects. The flat side of said stud being approximately alined with the axis of the screw-pivot 21. One end of the saw blade 29 lies against the flat side of said stud and the retainer pin 28 is passed through an opening in the saw blade in the usual manner.

The movable part of the blade-holding head at the inner end of the saw frame differs from that at the outer end in that the longitudinal member, designated by the numeral 30 is hollow and like the longitudinal member 25 has a cylindrical member 31 projecting upwardly from its outer end. The inner flat face of this member lies in contact with the outer flat face of the cylindrical member of the associated fixed part 19. These cylindrical parts are of like diameter and pivotally connected together by a screw pivot 21.

The hollow interior or bore of the longitudinal member 30 is preferably of square formation and in it is slidably arranged the square intermediate portion 32 of a blade-tensioning screw 33, the inner end of which is cylindrical, as at 34, and projects inwardly a distance beyond the inner end of said hollow longitudinal member. The inner extremity of said blade-tensioning screw is cutaway laterally to form a half-round terminal, against the flat side of which the adjacent end of the saw blade 29 lies, said terminal having an inwardly and laterally-directed blade-retainer pin 35 projecting from its flat side and passing through an oval hole 36 in the end of the saw blade. Said tensioning screw 33 is screw-threaded from the square intermediate portion 32 to its outer extremity and projects a distance beyond the outer end of the hollow longitudinal member 30; a thumb nut 37 being threaded thereon and a washer placed thereover between the thumb nut and said hollow longitudinal member. The tightening and loosening of said thumb-nut determines the tension applied to the saw blade, and for convenience in adjusting the blade angularly from one position to the other the tension should be slightly relieved.

The lower end of each end member is cutaway, as at 38, to form a chamber 39 within the channel-shaped member of its attached fixed part 19 and in the lower portion of this chamber is slidably arranged a lock dog 40 above which a helical compression spring 41 is arranged, one end of which bears against the upper end of said dog and the other end against the portion of said end member serving as the top wall of said chamber.

The cylindrical members 26 and 31 are provided with peripheral notches 42 into which the ends of the lock dogs are to be selectively entered, depending on the position which the saw blade is to have.

In order to conveniently manipulate said lock dogs, they are provided with laterally projecting finger pieces 43 which extend through slots 44 in the sides of the channel-shaped members 19 and are provided with enlargements or heads which at all times are in closed proximity to the movable parts of the blade-holding heads.

Since hack-saws now in use have blade-holding heads fixedly secured to the main portions of the frame, our invention can be easily applied thereto; it being a simple matter for a mechanic to loosen the heads removing the rivets, after which the adjustable blade-holding heads embodying our invention can be substituted therefor; rivets being fastened in the same rivet holes from which the old rivets were removed.

Assuming the saw blade to be positioned as shown in Figs. 1 and 2, and it is desired to swing the saw blade in the angular position shown in full lines in Fig. 3, or in dotted lines, the frame is grasped with both hands at opposite ends, with the thumbs against the headed finger pieces 42 and one of the fingers of each hand, maintained free, against the movable part of the adjacent blade-holding head. Upward pressure on the finger pieces will disengage the lock dogs from the notches 42 in the cylindrical parts 26 and 31 and allow the movable parts of the blade-holding heads to be swung either to the right or left, depending on the direction of the pressure exerted by the free fingers of the hand.

Tension on the saw blade is preferably relieved by slightly loosening the thumb nut 37, before attempting to angularly adjust the saw blade, and after adjustment has been effected, the blade will again be properly tensioned.

It will be apparent that since the axes of the elements to which the saw blade is directly attached is off-center with respect to the pivots 21, such elements and the saw blade are swung through an arc of a circle with each adjustment and by reason of the lock dogs and the finger pieces being in close proximity to the center of movement of said saw blade, an exceedingly compact arrangement of parts is provided which can be easily and most conveniently manipulated without straining the fingers of either hand or causing inconvenience to the operator in any manner.

Moreover, the construction and arrangement of parts are such that the saw blade will be perfectly rigid in any adjusted position, no lateral movement or wabbling of the blade being possible when in the act of sawing.

It will also be apparent that after releasing the lock-dogs from their retaining notches, the mere swinging of the saw blade a quarter of a circle will bring other retaining notches in alignment with the lock-dogs, which then move automatically into locking position. Consequently as soon as the notched cylindrical parts move on the screw pivots after releasing the lock-dogs from the notches, the engaging ends of said dogs ride over the smooth convex portions of said parts between notches, with the result that the hands are then entirely free to swing the blade into the desired adjusted position.

Hack-saws constructed with our invention differ very little in appearance from the conventional saws now in use; there being no prominent projecting parts, especially since the finger pieces 43 need have only sufficient projection to rest the thumbs thereagainst and prevent them slipping when exerting upward pressure thereagainst. In all other respects the parts are limited to substantially the same lateral and longitudinal dimensions of hack-saws now in common use.

Having thus described our invention, what we claim is:

1. A hack-saw, comprising a frame adjustable to accommodate saw blades of different lengths and having flat bars at its ends, blade-holding elements at opposite ends of said frame, said elements having channel-shaped parts receiving the terminals of said bars and each having a cylindrical portion at its lower end, a blade-holding part having a longitudinal member provided with an upwardly-projecting cylindrical portion at its outer end, said cylindrical portions co-acting with the cylindrical portions of said channel-shaped members and being co-axially connected together by a pivot, one of said longitudinal members having an integral stud extending inwardly therefrom and the other being hollow and having a stud slidable therein, each of said studs having laterally-projecting retainer pins, a saw-blade secured to said retainer pins, means for adjusting the stud within the hollow longitudinal member of one of said blade-holding parts to place said saw blade under tension, and co-acting means between said channel-shaped parts and the cylindrical portions of said blade-holding parts to hold the latter in any adjusted position.

2. A hack-saw having a frame provided at opposite ends with flat-bar end-members cut away at their lower ends along one edge thereof, a channel-shaped member fitted over the end of each of said end members and forming a chamber therein in which the walls of said cut-away portions serve as walls of said chamber, each of said channel-shaped members having a depending portion of reduced width and a vertical slot in one of its side walls, a lock-dog within each of said chambers, springs within said chambers serving to retain said lock-dogs in locking position, said lock-dogs having thumb pieces extending outwardly therefrom through said vertical slots, blade-holding members provided with upstanding cylindrical portions pivotally connected to said reduced depending portions and having spaced-apart peripheral notches into which said lock-dogs are to be selectively entered, blade-holding studs carried by said blade-holding members and one being adjustable lengthwise, and a saw blade connecting said studs and adapted to be placed under tension by actuation of said adjustable stud.

3. A hack-saw, comprising a frame having spaced-apart flat end members, a channel-shaped member fitted over the end of each of said members and having a chamber therein, each of said channel-shaped members having a depending portion of reduced widths and a vertical slot in one of its side walls opening to said chamber, a lock-dog within each of said chambers, springs within said chambers serving to maintain said lock-dogs in locking position, means extending through said vertical slots for manually actuating said lock-dogs, blade-holding members provided with upstanding cylindrical portions having spaced-apart peripheral notches into which said lock-dogs are to be selectively engaged, said cylindrical portions being pivotally secured to the depending portions of said channel-shaped members, blade-holding studs carried by said blade-holding members and disposed parallel with the pivots connecting said cylindrical portions with said depending portions, and a saw-blade connecting said studs.

4. A hack-saw, comprising a frame having spaced-apart end members including blade-holding elements at the terminals of said end members, said terminals having cut-away portions and said blade-holding elements comprising fixed parts channeled to enclose the end members at their cut-away portions and thus provide chambers within said fixed parts, spring-pressed dogs arranged within said chambers, means externally operable to move said dogs against the action of the springs, movable parts pivotally connected to said fixed parts and each comprising a cylindrical portion provided with spaced-apart notches adapted to be selectively positioned to receive said spring-pressed dogs, one of said movable parts having an integral stud parallel with its pivot and a laterally extending retainer pin and the other having a screw-stud slidable and non-rotatable therein and provided with a laterally extending retainer pin, a thumb nut applied to said screw stud and bearing against the movable part in which said stud is mounted, and a saw-blade secured to said retainer pin and adapted to be placed under tension by actuation of said thumb nut on said screw stud.

HERBERT E. O. SCHMIDT.
CHRISTOPHER J. HAEBERLE.